(12) United States Patent
Tang

(10) Patent No.: US 12,057,940 B2
(45) Date of Patent: Aug. 6, 2024

(54) DATA TRANSMISSION METHOD AND APPARATUS

(71) Applicant: HUAWEI TECHNOLOGIES CO., LTD., Shenzhen (CN)

(72) Inventor: Hao Tang, Ottawa (CA)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 18/183,719

(22) Filed: Mar. 14, 2023

(65) Prior Publication Data
US 2023/0224083 A1    Jul. 13, 2023

Related U.S. Application Data

(63) Continuation of application No. PCT/CN2021/113840, filed on Aug. 20, 2021.

(30) Foreign Application Priority Data

Sep. 15, 2020 (CN) .......................... 202010967902.8

(51) Int. Cl.
*H04L 1/00* (2006.01)
*H04L 1/1607* (2023.01)
*H04L 1/1812* (2023.01)
*H04L 27/34* (2006.01)

(52) U.S. Cl.
CPC .......... *H04L 1/1607* (2013.01); *H04L 1/1812* (2013.01); *H04L 27/3483* (2013.01)

(58) Field of Classification Search
CPC ... H04L 1/1607; H04L 1/1812; H04L 1/1822; H04L 27/3483
See application file for complete search history.

(56) References Cited

U.S. PATENT DOCUMENTS 7,986,741 B2 * 7/2011 Tsai ....................... H04L 1/0066
375/267
8,644,409 B2 * 2/2014 Gorokhov ............... H04L 27/36
370/464

(Continued)

*Primary Examiner* — Esaw T Abraham
(74) *Attorney, Agent, or Firm* — Leydig, Voit & Mayer, Ltd.

(57) ABSTRACT

This application provides a data transmission method and an apparatus. The method includes: A first device receives a first data packet and a second data packet from a second device, where the first data packet includes at least one first modulation symbol obtained by the second device by modulating a first codeword based on a first modulation scheme, and the second data packet includes at least one second modulation symbol obtained by modulating a second codeword based on the second modulation scheme; the first device receives a third data packet from the second device, where the third data packet includes at least one third modulation symbol, the third modulation symbol is obtained by the second device by modulating one bit group based on a third modulation scheme, and the one bit group includes at least one bit in the first codeword and at least one bit in the second codeword; and the first device decodes the first data packet, the second data packet, and the third data packet. In this way, reliability of data transmission can be improved.

20 Claims, 7 Drawing Sheets

(56) References Cited

U.S. PATENT DOCUMENTS

| | | | |
|---|---|---|---|
| 8,848,830 B2 * | 9/2014 | Clevorn | H04L 27/3411 |
| | | | 332/183 |
| 9,252,834 B2 * | 2/2016 | Seller | H03M 13/2721 |
| 10,735,153 B2 * | 8/2020 | Seo | H04L 1/0003 |
| 2006/0133533 A1 * | 6/2006 | Khandekar | H04L 1/0009 |
| | | | 375/279 |
| 2007/0223618 A1 * | 9/2007 | Jeong | H04L 1/007 |
| | | | 375/267 |

* cited by examiner

DATA TRANSMISSION METHOD AND APPARATUS

CROSS-REFERENCE TO RELATED APPLICATIONS

This application is a continuation of International Application No. PCT/CN2021/113840, filed on Aug. 20, 2021, which claims priority to Chinese Patent Application No. 202010967902.8, filed on Sep. 15, 2020. The disclosures of the aforementioned applications are hereby incorporated by reference in their entireties.

TECHNICAL FIELD

This application relates to the communications field, and more specifically, to a data transmission method and an apparatus.

BACKGROUND

As a mobile network is widely applied to various industries, services that need to be supported by the mobile network are increasingly diversified, and different service requirements such as an ultra-high rate, an ultra-low latency, an ultra-high reliability, and/or an ultra-multi-connection need to be met. In conventional mobile communication, according to a hybrid automatic repeat request (hybrid automatic repeat request, HARQ) manner, a receive end feeds back an acknowledgment (acknowledge, ACK) or a negative acknowledgment (negative acknowledge, NACK) to notify a transmit end that data is successfully received or not. However, this HARQ feedback manner is not applicable to some application scenarios, for example, a broadcast service scenario, a multi-hop relay communication scenario, and an ultra-reliable and low latency communication (ultra-reliable and low latency communication, URLLC) scenario. For example, if there are a large quantity of receiving devices in a broadcast service scenario, or if there are a large quantity of transmission hops in a multi-hop relay scenario, a very large quantity of feedback overheads are caused, and the HARQ feedback manner may not meet high reliability and latency requirements in the URLLC scenario.

SUMMARY

This application provides a data transmission method and an apparatus, to improve reliability of data transmission.

According to a first aspect, a data transmission method is provided. The method may be performed by a second device or a module (such as a chip) configured in (or configured for) the second device. An example in which the method is performed by the second device is used below for description.

The method includes: sending a first data packet and a second data packet to a first device, where the first data packet includes at least one first modulation symbol, the at least one first modulation symbol is obtained by modulating a first codeword based on a first modulation scheme, the second data packet includes at least one second modulation symbol, and the at least one second modulation symbol is obtained by modulating a second codeword based on the second modulation scheme; and sending a third data packet to the first device, where the third data packet includes at least one third modulation symbol, one third modulation symbol is obtained by modulating one bit group based on a third modulation scheme, and the one bit group includes at least one bit in the first codeword and at least one bit in the second codeword.

According to the foregoing solution, the first device can combine information about the first codeword in the first data packet and a retransmitted data packet, and combine information about the second codeword in the second data packet and a retransmitted data packet for decoding, to improve a probability of successful decoding. In addition, when at least one of the first data packet and the second data packet is successfully decoded, demodulation and decoding can be performed on the third data packet when the third data packet has prior information. A probability of successful decoding of a data packet is further improved, and reliability of data transmission is further improved.

With reference to the first aspect, in some implementations of the first aspect, the first modulation scheme corresponds to a first constellation diagram, and each constellation point in the first constellation diagram includes M bits; the second modulation scheme corresponds to a second constellation diagram, and each constellation point in the second constellation diagram includes Q bits; and the third modulation scheme corresponds to a third constellation diagram, and each constellation point in the third constellation diagram includes N bits, where M, Q, and N are positive integers.

With reference to the first aspect, in some implementations of the first aspect, the first modulation scheme is quadrature amplitude modulation QAM with a modulation order of M, and there is only 1 bit having a different value between two adjacent constellation points in the first constellation diagram; and/or the second modulation scheme is quadrature amplitude modulation QAM with a modulation order of Q, and there is only 1 bit having a different value between two adjacent constellation points in the second constellation diagram.

With reference to the first aspect, in some implementations of the first aspect, each constellation point in the third constellation diagram includes a first location and a second location, constellation point mapping is performed on bits in the first codeword based on the first location, and constellation point mapping is performed on bits in the second codeword based on the second location, where the first location includes P bits in the N bits, the second location includes N–P bits in the N bits, P and N are positive integers, and P<N.

With reference to the first aspect, in some implementations of the first aspect, a minimum Euclidean distance between constellation points in a plurality of constellation points with a same first location value in the third constellation diagram is greater than a minimum Euclidean distance between constellation points in the second constellation diagram; and/or a minimum Euclidean distance between constellation points in a plurality of constellation points with a same second location value in the third constellation diagram is greater than a minimum Euclidean distance between constellation points in the first constellation diagram.

According to the foregoing solution, when a minimum Euclidean distance between constellation points increases, an SNR requirement during data packet decoding can be reduced, decoding is successfully performed with a low SNR, and a probability of successful decoding is improved.

With reference to the first aspect, in some implementations of the first aspect, the first codeword includes L bits in total, the second codeword includes K bits in total, the third data packet includes $\min(\lfloor L/P \rfloor, \lfloor K/(N-P) \rfloor)$ third modulation symbols, and the third data packet further includes modulation symbols obtained by modulating remaining $L-P\min(\lfloor L/P \rfloor, \lfloor K/(N-P) \rfloor)$ bits in the first codeword and remaining $K-(N-P)\min(\lfloor L/P \rfloor, \lfloor K/(N-P) \rfloor)$ bits in the K bits.

With reference to the first aspect, in some implementations of the first aspect, the first codeword includes L bits in total, the second codeword includes K bits in total, and if L>K, the third data packet includes 2K/N third modulation symbols obtained by modulating K bits in the first codeword and K bits in the second codeword based on the third modulation scheme, and the third data packet further includes modulation symbols obtained by modulating remaining (L−K) bits in the first codeword based on the first modulation scheme or the third modulation scheme; or if L<K, the third data packet includes 2L/N third modulation symbols obtained by modulating L bits in the first codeword and L bits in the second codeword based on the third modulation scheme, and the third data packet further includes modulation symbols obtained by modulating remaining (K−L) bits in the second codeword based on the second modulation scheme or the third modulation scheme.

With reference to the first aspect, in some implementations of the first aspect, the method further includes: obtaining first configuration information, where the first configuration information indicates an association relationship between the third data packet and the first data packet, and/or an association relationship between the third data packet and the second data packet.

Optionally, the obtaining first configuration information may be receiving the first configuration information from external sources, or may be generating the first configuration information internally. According to the foregoing solution, the association relationship between the third data packet and the first data packet and/or the association relationship between the third data packet and the second data packet are/is determined based on the first configuration information, to determine that the third data packet is modulated based on the first codeword and the second codeword.

With reference to the first aspect, in some implementations of the first aspect, the sending a third data packet to the first device includes: sending the third data packet after receiving first feedback information and second feedback information from the first device, where the first feedback information indicates that the first data packet is not successfully received, and the second feedback information indicates that the second data packet is not successfully received.

According to the foregoing solution, when the first data packet and the second data packet are not successfully received, the third data packet is sent. In this way, a receive end can combine and decode the first data packet and a part corresponding to the first codeword in the third data packet, and combine and decode the second data packet and a part corresponding to the second codeword in the third data packet, to improve the probability of successful decoding. When one codeword is successfully decoded, it may be implemented that the third data packet decodes the other codeword when the third data packet has prior information. This further improves a probability of successful codeword decoding, and further improves reliability of data transmission.

According to a second aspect, a data transmission method is provided. The method may be performed by a first device or a module (for example, a chip) configured in (or configured for) the first device. An example in which the method is performed by the first device is used below for description.

The method includes: receiving a first data packet and a second data packet from a second device, where the first data packet includes at least one first modulation symbol obtained by modulating a first codeword based on a first modulation scheme, and the second data packet includes at least one second modulation symbol obtained by modulating a second codeword based on the second modulation scheme; receiving a third data packet from the second device, where the third data packet includes at least one third modulation symbol, and the third modulation symbol is obtained by modulating one bit group based on a third modulation scheme, and the one bit group includes at least one bit in the first codeword and at least one bit in the second codeword; and decoding the first data packet, the second data packet, and the third data packet.

With reference to the second aspect, in some implementations of the second aspect, the first modulation scheme corresponds to a first constellation diagram, and each constellation point in the first constellation diagram includes M bits; the second modulation scheme corresponds to a second constellation diagram, and each constellation point in the second constellation diagram includes Q bits; and the third modulation scheme corresponds to a third constellation diagram, and each constellation point in the third constellation diagram includes N bits, where M, Q, and N are positive integers.

With reference to the second aspect, in some implementations of the second aspect, the first modulation scheme is quadrature amplitude modulation QAM with a modulation order of M, and there is only 1 bit having a different value between two adjacent constellation points in the first constellation diagram; and/or the second modulation scheme is quadrature amplitude modulation QAM with a modulation order of Q, and there is only 1 bit having a different value between two adjacent constellation points in the second constellation diagram.

With reference to the second aspect, in some implementations of the second aspect, each constellation point in the third constellation diagram includes a first location and a second location, constellation point mapping is performed on bits in the first codeword based on the first location, and constellation point mapping is performed on bits in the second codeword based on the second location, where the first location includes P bits in the N bits, the second location includes N−P bits in the N bits, P and N are positive integers, and P<N.

With reference to the second aspect, in some implementations of the second aspect, the decoding the first data packet, the second data packet, and the third data packet includes: combining information that is in the at least one first modulation symbol and the at least one third modulation symbol and that corresponds to the first location, and then performing decoding; and combining information that is in the at least one second modulation symbol and the at least one third modulation symbol and that corresponds to the second location, and then performing decoding.

With reference to the second aspect, in some implementations of the second aspect, a minimum Euclidean distance between constellation points in a plurality of constellation points with a same first location value in the third constellation diagram is greater than a minimum Euclidean distance between constellation points in the second constellation diagram; and/or a minimum Euclidean distance between constellation points in a plurality of constellation points with a same second location value in the third constellation diagram is greater than a minimum Euclidean distance between constellation points in the first constellation diagram.

With reference to the second aspect, in some implementations of the second aspect, the first codeword includes L bits in total, the second codeword includes K bits in total, the third data packet includes $\min(\lfloor L/P \rfloor, \lfloor K/(N-P) \rfloor)$ third modulation symbols, and the third data packet further includes modulation symbols obtained by modulating remaining $L-P\min(\lfloor L/P \rfloor, \lfloor K/(N-P) \rfloor)$ bits in the first codeword and remaining $K-(N-P)\min(\lfloor L/P \rfloor, \lfloor K/(N-P) \rfloor)$ bits in the K bits.

With reference to the second aspect, in some implementations of the second aspect, the first codeword includes L bits in total, and the second codeword includes K bits in total; if L>K, the third data packet includes 2K/N third modulation symbols obtained by modulating K bits in the first codeword and K bits in the second codeword based on the third modulation scheme, and the third data packet further includes modulation symbols obtained by modulating remaining (L−K) bits in the first codeword based on the first modulation scheme or the third modulation scheme; or if L<K, the third data packet includes 2L/N third modulation symbols obtained by modulating L bits in the first codeword and L bits in the second codeword based on the third modulation scheme, and the third data packet further includes modulation symbols obtained by modulating remaining (K−L) bits in the second codeword based on the second modulation scheme or the third modulation scheme.

With reference to the second aspect, in some implementations of the second aspect, the method further includes: obtaining first configuration information, where the first configuration information indicates an association relationship between the third data packet and the first data packet, and/or an association relationship between the third data packet and the second data packet.

Optionally, the obtaining first configuration information may be receiving the first configuration information from external sources, or may be generating the first configuration information internally.

With reference to the second aspect, in some implementations of the second aspect, the receiving a third data packet from the second device includes: receiving the third data packet after sending first feedback information and second feedback information to the second device, where the first feedback information indicates that the first data packet is not successfully received, and the second feedback information indicates that the second data packet is not successfully received.

According to a third aspect, a communications apparatus is provided. The apparatus is a second device or a module (such as a chip) configured in (or configured for) the second device.

The communications apparatus includes: a processing unit, configured to modulate a first codeword based on a first modulation scheme to obtain at least one first modulation symbol, and modulate a second codeword based on a second modulation mode to obtain at least one second modulation symbol; and a transceiver unit, configured to send a first data packet and a second data packet to a first device, where the first data packet includes the at least one first modulation symbol, the second data packet includes the at least one second modulation symbol, the transceiver unit is further configured to send a third data packet to the first device, the third data packet includes at least one third modulation symbol, one third modulation symbol is obtained by modulating one bit group based on a third modulation scheme, and the one bit group includes at least one bit in the first codeword and at least one bit in the second codeword.

With reference to the third aspect, in some implementations of the third aspect, the first modulation scheme corresponds to a first constellation diagram, and each constellation point in the first constellation diagram includes M bits; the second modulation scheme corresponds to a second constellation diagram, and each constellation point in the second constellation diagram includes Q bits; and the third modulation scheme corresponds to a third constellation diagram, and each constellation point in the third constellation diagram includes N bits, where M, Q, and N are positive integers.

With reference to the third aspect, in some implementations of the third aspect, the first modulation scheme is quadrature amplitude modulation QAM with a modulation order of M, and there is only 1 bit having a different value between two adjacent constellation points in the first constellation diagram; and/or the second modulation scheme is quadrature amplitude modulation QAM with a modulation order of Q, and there is only 1 bit having a different value between two adjacent constellation points in the second constellation diagram.

With reference to the third aspect, in some implementations of the third aspect, each constellation point in the third constellation diagram includes a first location and a second location, constellation point mapping is performed on bits in the first codeword based on the first location, and constellation point mapping is performed on bits in the second codeword based on the second location, where the first location includes P bits in the N bits, the second location includes N−P bits in the N bits, P and N are positive integers, and P<N.

With reference to the third aspect, in some implementations of the third aspect, a minimum Euclidean distance between constellation points in a plurality of constellation points with a same first location value in the third constellation diagram is greater than a minimum Euclidean distance between constellation points in the second constellation diagram; and/or a minimum Euclidean distance between constellation points in a plurality of constellation points with a same second location value in the third constellation diagram is greater than a minimum Euclidean distance between constellation points in the first constellation diagram.

With reference to the third aspect, in some implementations of the third aspect, the first codeword includes L bits in total, the second codeword includes K bits in total, the third data packet includes $\min(\lfloor L/P \rfloor, \lfloor K/(N-P) \rfloor)$ third modulation symbols, and the third data packet further includes modulation symbols obtained by modulating remaining $L-P\min(\lfloor L/P \rfloor, \lfloor K/(N-P) \rfloor)$ bits in the first codeword and remaining $K-(N-P)\min(\lfloor L/P \rfloor, \lfloor K/(N-P) \rfloor)$ bits in the K bits.

With reference to the third aspect, in some implementations of the third aspect, the first codeword includes L bits in total, the second codeword includes K bits in total; if L>K, the third data packet includes 2K/N third modulation symbols obtained by modulating K bits in the first codeword and K bits in the second codeword based on the third modulation scheme, and the third data packet further includes modulation symbols obtained by modulating remaining (L−K) bits in the first codeword based on the first modulation scheme or the third modulation scheme; or if L<K, the third data packet includes 2L/N third modulation symbols obtained by modulating L bits in the first codeword and L bits in the second codeword based on the third modulation scheme, and the third data packet further includes modulation symbols obtained by modulating remaining (K−L) bits in the second codeword based on the second modulation scheme or the third modulation scheme.

With reference to the third aspect, in some implementations of the third aspect, the transceiver unit is further configured to obtain first configuration information, where the first configuration information indicates an association relationship between the third data packet and the first data packet, and/or indicates an association relationship between the third data packet and the second data packet.

Optionally, the obtaining first configuration information may be receiving the first configuration information from external resources, or may be generating the first configuration information internally.

With reference to the third aspect, in some implementations of the third aspect, the transceiver unit is specifically configured to send the third data packet to the first device after receiving first feedback information and second feedback information from the first device, where the first feedback information indicates that the first data packet is not successfully received, and the second feedback information indicates that the second data packet is not successfully received.

According to a fourth aspect, a communications apparatus is provided. The apparatus is a first device or a module (such as a chip) configured in (or configured for) the first device.

The communications apparatus includes: a transceiver unit, configured to receive a first data packet and a second data packet from a second device, where the first data packet includes at least one first modulation symbol obtained by modulating a first codeword based on a first modulation scheme, the second data packet includes at least one second modulation symbol obtained by modulating a second codeword based on the second modulation scheme, the transceiver unit is further configured to receive a third data packet from the second device, the third data packet includes at least one third modulation symbol, the third modulation symbol is obtained by modulating one bit group based on a third modulation scheme, and the one bit group includes at least one bit in the first codeword and at least one bit in the second codeword; and a processing unit, configured to decode the first data packet, the second data packet, and the third data packet.

With reference to the fourth aspect, in some implementations of the fourth aspect, the first modulation scheme corresponds to a first constellation diagram, and each constellation point in the first constellation diagram includes M bits; the second modulation scheme corresponds to a second constellation diagram, and each constellation point in the second constellation diagram includes Q bits; and the third modulation scheme corresponds to a third constellation diagram, and each constellation point in the third constellation diagram includes N bits, where M, Q, and N are positive integers.

With reference to the fourth aspect, in some implementations of the fourth aspect, the first modulation scheme is quadrature amplitude modulation QAM with a modulation order of M, and there is only 1 bit having a different value between two adjacent constellation points in the first constellation diagram; and/or the second modulation scheme is quadrature amplitude modulation QAM with a modulation order of Q, and there is only 1 bit having a different value between two adjacent constellation points in the second constellation diagram.

With reference to the fourth aspect, in some implementations of the fourth aspect, each constellation point in the third constellation diagram includes a first location and a second location, constellation point mapping is performed on bits in the first codeword based on the first location, and constellation point mapping is performed on bits in the second codeword based on the second location, where the first position includes P bits in the N bits, the second position includes N−P bits in the N bits, P and N are positive integers, and P<N.

With reference to the fourth aspect, in some implementations of the fourth aspect, the decoding the first data packet, the second data packet, and the third data packet includes: combining information that is in the at least one first modulation symbol and the at least one third modulation symbol and that corresponds to the first location, and then performing decoding; and combining information that is in the at least one second modulation symbol and the at least one third modulation symbol and that corresponds to the second location, and then performing decoding.

With reference to the fourth aspect, in some implementations of the fourth aspect, a minimum Euclidean distance between constellation points in a plurality of constellation points with a same first location value in the third constellation diagram is greater than a minimum Euclidean distance between constellation points in the second constellation diagram; and/or a minimum Euclidean distance between constellation points in a plurality of constellation points with a same second location value in the third constellation diagram is greater than a minimum Euclidean distance between constellation points in the first constellation diagram.

With reference to the fourth aspect, in some implementations of the fourth aspect, the first codeword includes L bits in total, the second codeword includes K bits in total, the third data packet includes $\min(\lfloor L/P \rfloor, \lfloor K/(N-P) \rfloor)$ third modulation symbols, and the third data packet further includes modulation symbols obtained by modulating remaining $L-P\min(\lfloor L/P \rfloor, \lfloor K/(N-P) \rfloor)$ bits in the first codeword and remaining $K-(N-P)\min(\lfloor L/P \rfloor, \lfloor K/(N-P) \rfloor)$ bits in the K bits.

With reference to the fourth aspect, in some implementations of the fourth aspect, the first codeword includes L bits in total, the second codeword includes K bits in total; if L>K, the third data packet includes 2K/N third modulation symbols obtained by modulating K bits in the first codeword and K bits in the second codeword based on the third modulation scheme, and the third data packet further includes modulation symbols obtained by modulating remaining (L−K) bits in the first codeword based on the first modulation scheme or the third modulation scheme; or if L<K, the third data packet includes 2L/N third modulation symbols obtained by modulating L bits in the first codeword and L bits in the second codeword based on the third modulation scheme, and the third data packet further includes modulation symbols obtained by modulating remaining (K−L) bits in the second codeword based on the second modulation scheme or the third modulation scheme.

With reference to the fourth aspect, in some implementations of the fourth aspect, the transceiver unit is further configured to obtain first configuration information, where the first configuration information indicates an association relationship between the third data packet and the first data packet, and/or indicates an association relationship between the third data packet and the second data packet.

Optionally, the obtaining first configuration information may be receiving the first configuration information from external resources, or may be generating the first configuration information internally.

With reference to the fourth aspect, in some implementations of the fourth aspect, the transceiver unit is specifically configured to receive the third data packet from the second device after sending first feedback information and second feedback information to the second device, where the first feedback information indicates that the first data packet is not successfully received, and the second feedback information indicates that the second data packet is not successfully received.

According to a fifth aspect, a communications apparatus is provided, including a processor. The processor may implement the method according to any one of the first aspect and the possible implementations of the first aspect.

Optionally, the communications apparatus further includes a memory. The processor is coupled to the memory, and may be configured to execute instructions in the memory, to implement the method according to any one of the first aspect and the possible implementations of the first aspect.

Optionally, the communications apparatus further includes a communications interface, and the processor is coupled to the communications interface.

In this embodiment of this application, the communications interface may be a transceiver, a pin, a circuit, a bus, a module, or a communications interface of another type. This is not limited.

In an implementation, the communications apparatus is a terminal device or a network device. The communications interface may be a transceiver or an input/output interface.

In another implementation, the communications apparatus is a chip configured in a terminal device or a network device. The communications interface may be an input/output interface.

Optionally, the transceiver may be a transceiver circuit. Optionally, the input/output interface may be an input/output circuit.

According to a sixth aspect, a communications apparatus is provided, including a processor. The processor may implement the method according to any one of the second aspect and the possible implementations of the second aspect.

Optionally, the communications apparatus further includes a memory. The processor is coupled to the memory, and may be configured to execute instructions in the memory, to implement the method according to any one of the second aspect or the possible implementations of the second aspect.

Optionally, the communications apparatus further includes a communications interface, and the processor is coupled to the communications interface.

In this embodiment of this application, the communications interface may be a transceiver, a pin, a circuit, a bus, a module, or a communications interface of another type. This is not limited.

In an implementation, the communications apparatus is a terminal device or a network device. The communications interface may be a transceiver or an input/output interface.

In another implementation, the communications apparatus is a chip configured in a terminal device or a network device. The communications interface may be an input/output interface.

Optionally, the transceiver may be a transceiver circuit. Optionally, the input/output interface may be an input/output circuit.

According to a seventh aspect, an embodiment of this application provides a communications apparatus, including: a logic circuit and a communications interface. The communications interface is configured to obtain to-be-processed data and/or output processed data, and the logic circuit is configured to process the to-be-processed data or obtain the processed data, so that the communications apparatus is enabled to perform the method according to any one of the first aspect or the second aspect and the possible implementations of the first aspect or the second aspect.

In a feasible design, the communications interface includes an input interface and an output interface.

In an implementation, the logic circuit is configured to process a first codeword to obtain a first data packet, and process a second codeword to obtain a second data packet. The first data packet includes at least one first modulation symbol obtained by modulating the first codeword based on a first modulation scheme, and the second data packet includes at least one second modulation symbol obtained by modulating the second codeword based on a second modulation scheme. The communications interface is configured to output the first data packet and the second data packet. The logic circuit is further configured to process the first codeword and the second codeword to obtain a third data packet. The third data packet includes at least one third modulation symbol, one third modulation symbol is obtained by modulating one bit group based on a third modulation scheme, and the one bit group includes at least one bit in the first codeword and at least one bit in the second codeword. The communications interface is further configured to output the third data packet.

In another implementation, the communications interface is configured to input a first data packet and a second data packet. The first data packet includes at least one first modulation symbol obtained by modulating a first codeword based on a first modulation scheme, and the second data packet includes at least one second modulation symbol obtained by modulating a second codeword based on a second modulation scheme. The communications interface is further configured to input a third data packet. The third data packet includes at least one third modulation symbol, one third modulation symbol is obtained by modulating one bit group based on a third modulation scheme, and the one bit group includes at least one bit in the first codeword and at least one bit in the second codeword. The logic circuit is configured to decode the first data packet, the second data packet, and the third data packet.

According to an eighth aspect, a processor is provided. The processor includes an input circuit, an output circuit, and a processing circuit. The processing circuit is configured to: receive a signal through the input circuit, and transmit a signal through the output circuit, to enable the processor to implement the method according to any one of the first aspect or the second aspect and the possible implementations of the first aspect to the fifth aspect.

In a specific implementation process, the processor may be one or more chips, the input circuit may be an input pin, the output circuit may be an output pin, and the processing circuit may be a transistor, a gate circuit, a trigger, any logic circuit, or the like. An input signal received by the input circuit may be, for example but not limited to, received and input by a receiver. A signal output by the output circuit may be, for example but not limited to, output to a transmitter and transmitted by the transmitter. The input circuit and the output circuit may be a same circuit, where the circuit is used as an input circuit or an output circuit in different time. Specific implementations of the processor and various circuits are not limited in embodiments of this application.

According to a ninth aspect, a processing apparatus is provided, including a processor and a memory. The processor is configured to: read instructions stored in the memory, receive a signal through a receiver, and transmit a signal through a transmitter, to implement the method according to any one of the first aspect or the second aspect and the possible implementations of the first aspect or the second aspect.

Optionally, there may be one or more processors, and there may be one or more memories.

Optionally, the memory may be integrated with the processor, or the memory and the processor are separately disposed.

Specifically, data output by the processor may be output to the transmitter, and input data received by the processor may be from the receiver. The transmitter and the receiver may be collectively referred to as a transceiver.

The processing apparatus in the ninth aspect may be one or more chips. The processor in the processing apparatus may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor and exist independently.

According to a tenth aspect, a computer program product is provided. The computer program product includes a computer program (also referred to as code or instructions). When the computer program is run, the computer is enabled to perform the method according to any one of the first aspect or the second aspect and the possible implementations of the first aspect or the second aspect.

According to an eleventh aspect, a computer-readable medium is provided. The computer-readable medium stores a computer program (also referred to as code or instructions). When the computer program is run on a computer, the computer is enabled to perform the method according to any one of the first aspect or the second aspect and the possible implementations of the first aspect or the second aspect.

According to a twelfth aspect, a communications system is provided, including the foregoing first device and second device.

DESCRIPTION OF EMBODIMENTS

Figure 1:
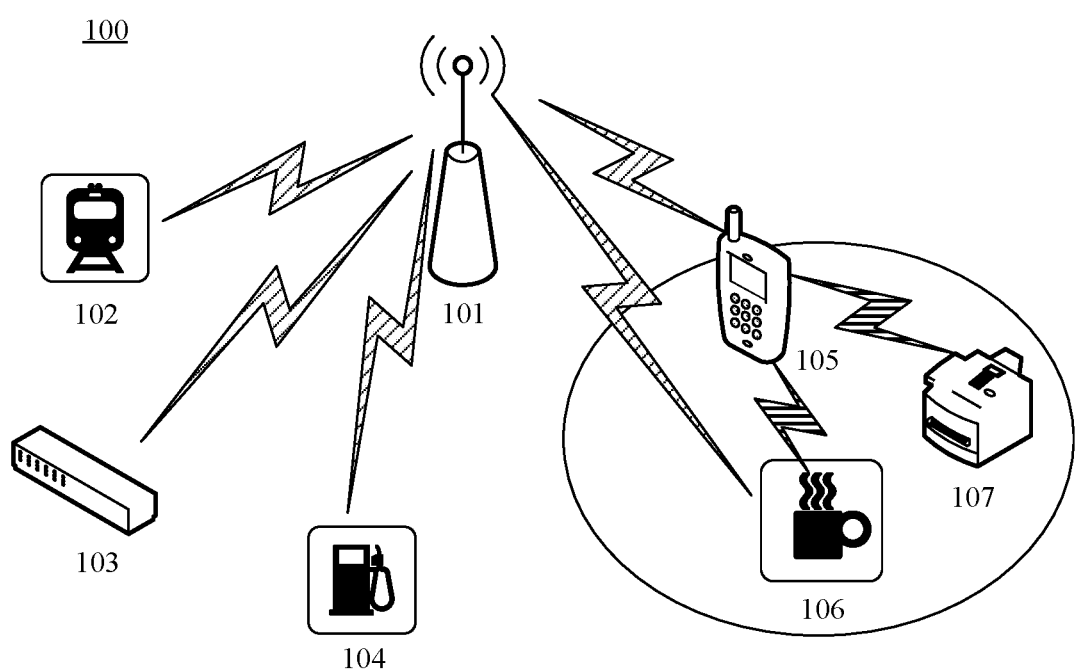
FIG. 1 is a schematic diagram of an architecture of a communications system applicable to embodiments of this application.

The following describes technical solutions of this application with reference to the accompanying drawings.

The communications method provided in this application may be applied to various communications systems, for example, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communications system, a 5th generation (5th generation, 5G) mobile communications system, or a new radio access technology (new radio access technology, NR). The 5G mobile communications system may include a non-standalone (non-standalone, NSA) communications system and/or a standalone (standalone, SA) communications system. The communications method according to this application may be further applied to a future communications system, for example, a sixth generation mobile communications system. This is not limited in this application.

The communications method according to this application may be further applied to a machine type communication (machine type communication, MTC), a long term evolution (long term evolution, LTE) technology for machine-to-machine communication, a device-to-device (device to device, D2D) network, a machine to machine (machine to machine, M2M) network, an internet of things (internet of things, IoT) network, or another network. The IoT network may include, for example, an internet of vehicles. Communications modes in an internet of vehicles system are collectively referred to as vehicle to everything (vehicle to everything, V2X). For example, V2X may include vehicle to vehicle (vehicle to vehicle, V2V) communications, vehicle to infrastructure (vehicle to infrastructure, V2I) communications, vehicle to pedestrian (vehicle to pedestrian, V2P) communications, vehicle to network (vehicle to network, V2N) communications, or the like.

In embodiments of this application, the network device may be a device having a wireless transceiver function. The network device includes but is not limited to: an evolved NodeB (evolved Node B, eNB), a radio network controller (radio network controller, RNC), a NodeB (Node B, NB), a base station controller (base station controller, BSC), a base transceiver station (base transceiver station, BTS), a home evolved base station (for example, a home evolved NodeB, or a home Node B, HNB), a baseband unit (baseband unit, BBU), an access point (access point, AP) in a wireless fidelity (wireless fidelity, Wi-Fi) system, a wireless relay node, a wireless backhaul node, a transmission point (transmission point, TP), a transmission and reception point (transmission and reception point, TRP), or the like. Alternatively, the network device may be a gNB or a transmission point (TRP or TP) in a 5G system such as an NR system, may be one antenna panel or a group (including a plurality of antenna panels) of antenna panels of a base station in a 5G system, or may be a network node, such as a baseband unit (BBU) or a distributed unit (distributed unit, DU), that constitutes a gNB or a transmission point.

In some deployments, the gNB may include a centralized unit (centralized unit, CU) and a DU. The gNB may further include an active antenna unit (active antenna unit, AAU). The CU implements some functions of the gNB, and the DU implements some functions of the gNB. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, to implement functions of a radio link control (radio link control, RLC) layer, a medium access control (medium access control, MAC) layer, and a physical (physical, PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (radio access network, RAN), or the CU may be classified into a network device in a core network (core network, CN). This is not limited in this application.

In embodiments of this application, the terminal device may also be referred to as user equipment (user equipment, UE), an access terminal, a subscriber unit, a subscriber station, a mobile station, a remote station, a remote terminal, a mobile device, a user terminal, a terminal, a wireless communications device, a user agent, or a user apparatus.

The terminal device may be a device that provides voice/data connectivity for a user, for example, a handheld device having a wireless connection function or an on-board device. Currently, some examples of the terminal may be: a mobile phone (mobile phone), a pad (pad), a computer (for example, a notebook computer or a palmtop computer) with a wireless transceiver function, a mobile internet device (mobile internet device, MID), a virtual reality (virtual reality, VR) device, an augmented reality (augmented reality, AR) device, a wireless terminal in industrial control (industrial control), a wireless terminal in self-driving (self-driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device or a computing device with a wireless communications function, another processing device connected to a wireless modem, a vehicle-mounted device, a wearable device, a terminal device in a 5G network, and a terminal device in a future evolved public land mobile network (public land mobile network, PLMN).

The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that is directly worn on a body or integrated into clothes or an accessory of a user. The wearable device is not only a hardware device, but is used to implement a powerful function through software support, data exchange, and cloud interaction. In a broad sense, intelligent wearable devices include full-featured and large-size devices that can implement complete or partial functions without depending on smartphones, for example, smart watches or smart glasses, and devices that dedicated to only one type of application and need to be used together with other devices such as smartphones, such as various smart bands or smart jewelry used for monitoring physical signs.

In addition, the terminal device may alternatively be a terminal device in an internet of things (internet of things, IoT) system. An IoT is an important part in future development of information technologies. A main technical feature of the IoT is to connect things to a network by using a communications technology, to implement an intelligent network for human-machine interconnection and thing-thing interconnection. IoT technologies can achieve massive connections, deep coverage, and terminal power saving by using, for example, a narrow band (narrow band, NB) technology.

In addition, the terminal device may alternatively include sensors such as an intelligent printer, a train detector, and a gas station, and main functions include: collecting data (which is a function of some terminal devices), receiving control information and downlink data of a network device, sending an electromagnetic wave, and transmitting uplink data to the network device.

For ease of understanding of embodiments of this application, a communications system to which a data transmission method according to an embodiment of this application is applicable is first described in detail with reference to FIG. 1. As shown in the figure, the communications system 100 may include at least one network device, such as a network device 101 shown in FIG. 1. The communications system 100 may further include at least one terminal device, such as terminal devices 102 to 107 shown in FIG. 1. The terminal devices 102 to 107 may be movable or fixed. The network device 101 may communicate with one or more of the terminal devices 102 to 107 through a radio link. Data transmission may be performed between the network device and the terminal device by using the data transmission method provided in this embodiment of this application. Optionally, the terminal devices may directly communicate with each other. For example, the direct communications between the terminal devices may be implemented by using a D2D technology. As shown in the figure, the terminal devices 105 and 106 may directly communicate with each other by using the D2D technology, and the terminal devices 105 and 107 may directly communicate with each other by using the D2D technology. The terminal devices 106 and 107 may separately or simultaneously communicate with the terminal device 105. When the terminal device communicates with the terminal device, data transmission may be performed by using the data transmission method according to this embodiment of this application.

It should be understood that, FIG. 1 shows an example of one network device, a plurality of terminal devices, and communications links between the communications devices. Optionally, the communications system 100 may include a plurality of network devices, and another quantity of terminal devices, for example, more or fewer terminal devices may be included in coverage of each network device. This is not limited in this application.

During data transmission, for example, in a URLLC scenario, there is a low probability that consecutive errors occur in data packets. Therefore, this application proposes that a transmit end sends a retransmitted data packet after sending a plurality of data packets, where each modulation symbol in the retransmitted data packet includes data bits in at least two previously transmitted data packets. When at least one data packet of the at least two data packets is successfully decoded, demodulation and decoding can be performed on the retransmitted data packet when the retransmitted data packet has prior information. In this way, when a receive end can perform combined receiving, a signal to noise ratio (signal to noise ratio, SNR) of a data packet is improved, a probability of successful decoding of the data packet is further improved, and reliability of data transmission is improved.

An embodiment of this application further provides a constellation diagram design solution of a modulation scheme. In a plurality of constellation diagrams which a same value of a specific bit in the constellation diagram, a Euclidean distance between two adjacent constellation points is at least greater than a Euclidean distance between two adjacent constellation points in a gray (gray) mapping constellation diagram with a same modulation order. In this way, when one data packet of the at least two data packets is successfully decoded, Euclidean distances of constellation points corresponding to other data packets are increased, a probability of successful decoding is further improved, and reliability of data transmission is improved.

The following describes the data transmission method according to this application with reference to the accompanying drawings.

Figure 2:
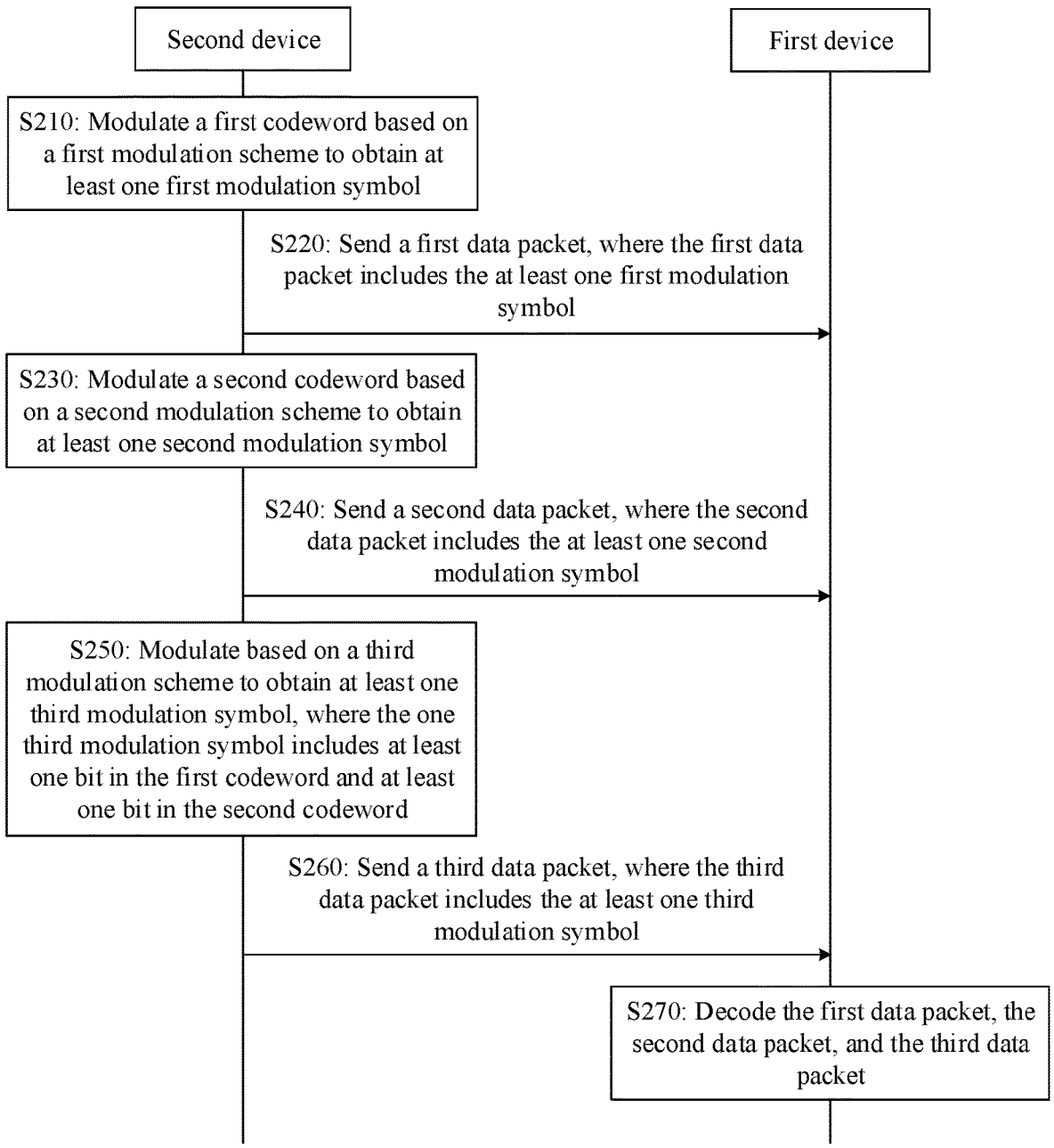
FIG. 2 is a schematic flowchart of a data transmission method according to an embodiment of this application.

FIG. 2 is a schematic flowchart of a data transmission method according to an embodiment of this application.

A first device and a second device may perform data transmission by using the embodiment shown in FIG. 2. The first device may be a network device or a terminal device, and the second device may be a network device or a terminal device. This is not limited in this application.

S210: The second device modulates a first codeword based on a first modulation scheme to obtain at least one first modulation symbol.

The second device modulates the first codeword based on the first modulation scheme, and one modulation symbol is obtained for every M bits based on the first modulation scheme. If the first codeword includes L bits, the second device modulates the first codeword based on the first modulation scheme to obtain L/M first modulation symbols, where L≥M, and L and M are positive integers.

Optionally, the first modulation scheme corresponds to a first constellation diagram, and each constellation point in the first constellation diagram includes M bits.

Figure 3:
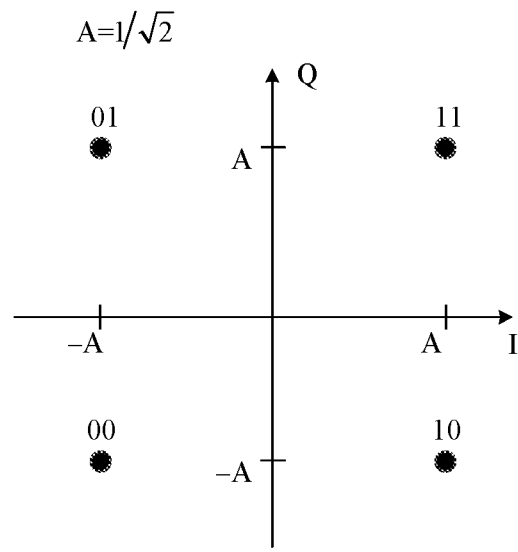
FIG. 3 is a constellation diagram of QPSK according to an embodiment of this application.

For example, the first constellation diagram is a gray constellation mapping diagram. When M=2, the first modulation scheme is quadrature phase shift keying (quadrature phase shift keying, QPSK), and the first constellation diagram may be shown in FIG. 3, where a horizontal axis represents an in-phase (in-phase) component I, and a vertical axis represents a quadrature (quadrature) component Q.

Figure 4:
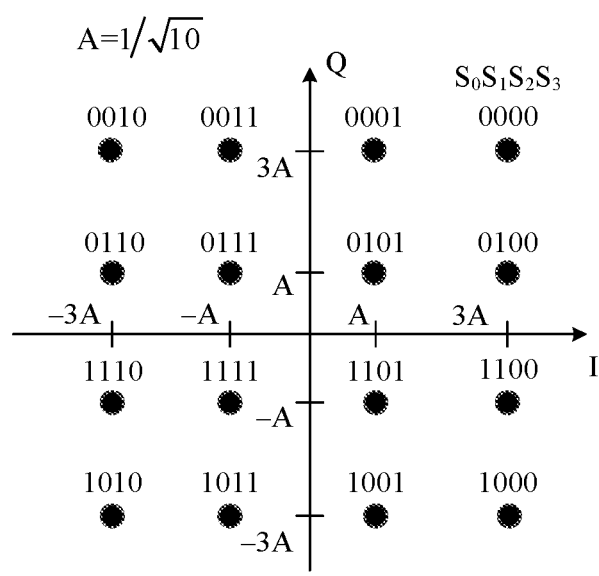
FIG. 4 is a constellation diagram of 16QAM according to an embodiment of this application.

When M=4, the first modulation scheme is quadrature amplitude modulation (quadrature amplitude modulation) with a modulation order of 4, that is, 16 QAM, and the first constellation diagram may be shown in FIG. 4. Alternatively, the first modulation scheme may be another modulation scheme such as 256 QAM or 1024 QAM. This is not limited in this application.

When the first constellation diagram is a gray constellation mapping diagram, there is only 1 bit having a different value between two adjacent constellation points in the first constellation diagram.

S220: The second device sends a first data packet to the first device, where the first data packet includes the at least one first modulation symbol.

Correspondingly, the first device receives the first data packet from the second device. The first data packet includes L/M first modulation symbols obtained by the second device by modulating the first codeword based on the first modulation scheme.

S230: The second device modulates a second codeword based on a second modulation scheme to obtain at least one second modulation symbol.

The second device modulates the second codeword based on the second modulation scheme, and one modulation symbol is obtained for every Q bits based on the second modulation scheme. If the second codeword includes K bits, the second device modulates the second codeword based on the second modulation scheme to obtain K/Q second modulation symbols, where K≥Q, and K and Q are positive integers.

It should be understood that the first codeword and the second codeword may be generated by using a same channel coding mode, or may be generated by using different channel coding modes. This is not limited in this application.

Optionally, the second modulation scheme corresponds to a second constellation diagram, and each constellation point in the second constellation diagram includes Q bits.

For example, the second constellation diagram is a gray constellation mapping diagram. When M=2, the second modulation scheme is QPSK shown in FIG. 3. When M=4, the second modulation scheme is 16 QAM shown in FIG. 4. Alternatively, the second modulation scheme may be another modulation scheme such as 256 QAM or 1024 QAM. This is not limited in this application.

When the second constellation diagram is a gray constellation mapping diagram, there is only 1 bit having a different value between two adjacent constellation points in the second constellation diagram.

In an implementation, the second device may first send the first data packet and then send a second data packet in a time sequence.

For example, the second device sends the first data packet in a first time period, and sends the second data packet in a second time period. However, this application is not limited thereto.

In another implementation, the second device may separately send the first data packet and the second data packet at different frequency domain resource locations in a same time period.

For example, the first device communicates with the second device in a carrier aggregation (carrier aggregation, CA) manner, and the first data packet and the second data packet are carried on different carriers in a same time period. Alternatively, the first data packet and the second data packet may be carried on different bandwidth parts of a same carrier. However, this application is not limited thereto.

S240: The second device sends the second data packet to the first device, where the second data packet includes the at least one second modulation symbol.

Correspondingly, the first device receives the second data packet from the second device. The second data packet includes K/Q second modulation symbols obtained by the second device by modulating the second codeword based on the second modulation scheme.

S250: The second device obtains at least one third modulation symbol based on a third modulation scheme. One third modulation symbol includes at least one bit in the first codeword and at least one bit in the second codeword.

Specifically, one third modulation symbol is obtained by the second device by modulating one bit group based on the third modulation scheme. One bit group includes N bits, the N bits include at least one bit in the first codeword and at least one bit in the second codeword, and N is a positive integer greater than or equal to 2.

According to the foregoing solution, the first device can combine information about the first codeword in the first data packet and the retransmitted data packet, and combine information about the second codeword in the second data packet and the retransmitted data packet. When at least one data packet in the first data packet and the second data packet is successfully decoded, demodulation and decoding can be performed on the third data packet when the third data packet has prior information. An SNR requirement during data packet decoding can be reduced, decoding can be successfully performed with a low SNR, a probability of successful decoding of the data packet is improved, and reliability of data transmission is improved.

Optionally, the third modulation scheme corresponds to a third constellation diagram, and each constellation point in the third constellation diagram includes N bits.

Optionally, N bits of each constellation point include a first location and a second location. Constellation point mapping is performed on bits in the first codeword based on the first location, and constellation point mapping is performed on bits in the second codeword based on the second location, where the first location includes P bits in the N bits, the second location includes N−P bits in the N bits, and P is a positive integer less than N.

For example, the third modulation scheme is 16 QAM shown in FIG. 4, that is, one constellation point includes 4 bits (N=4). Bits of the 4 bits of each constellation point are sequentially denoted as $S_0$, $S_1$, $S_2$, and $S_3$. The first location may include $S_0$ and $S_1$, and the second location may include $S_2$ and $S_3$. Constellation point mapping is performed for the first codeword based on $S_0$ and $S_1$, and constellation point mapping is performed for the second codeword based on $S_2$ and $S_3$. If the second device obtains the first codeword through decoding but fails to decode the second codeword, the second device may demodulate the third data packet by using the first codeword as the prior information, to obtain more accurate demodulation information of the second codeword in the third data packet. Specifically, when $S_0$ and $S_1$ corresponding to the first codeword in the constellation diagram are known, a probability of successful decoding of a modulation symbol changes from 1/16 to 1/4. For example, if it is known that the first two bits in the 4 bits corresponding to a modulation symbol are 00, a range of the modulation symbol is reduced from originally corresponding to one of the 16 constellation points in the constellation diagram to corresponding to four points whose Q-axis values are 2A, that is, 0010, 0011, 0001, and 0000. This increases a probability that the second device successfully decodes the second codeword. Otherwise, a same processing manner may also be used when the second device obtains the second codeword through decoding but fails to decode the first codeword.

It should be noted that the first location and the second location may be set based on a specific embodiment. This is not limited in this application. For example, in the foregoing example, the first location may be $S_0$ and $S_2$, and the second location may be $S_1$ and $S_3$; or the first location may be $S_0$, $S_1$, and $S_2$, and the second location may be $S_3$. In addition, in the foregoing example, one third modulation symbol including bits in two data packets is used as an example for description. However, this application is not limited thereto. One third modulation symbol may further include bits in more data packets, and an implementation is similar to that of the two data packets. For brevity, details are not described herein again.

Optionally, a minimum Euclidean distance between constellation points in a plurality of constellation points with a same first location value in the third constellation diagram is greater than a minimum Euclidean distance between constellation points in the second constellation diagram; and/or a minimum Euclidean distance between constellation points in a plurality of constellation points with a same second location value in the third constellation diagram is greater than a minimum Euclidean distance between constellation points in the second constellation diagram.

A Euclidean distance between two constellation points closest to each other in a plurality of constellation points may be referred to as a minimum Euclidean distance between constellation points in the plurality of constellation points. For example, in the constellation diagram of QPSK shown in FIG. 3, if a Euclidean distance between two constellation points that are closest to each other is $\sqrt{2}$, a minimum Euclidean distance between constellation points in the constellation diagram of QPSK is $\sqrt{2}$. In the constellation diagram of 16 QAM shown in FIG. 4, if a Euclidean distance between two constellation points that are closest to each other is $2/\sqrt{10}$, a minimum Euclidean distance between constellation points in the constellation diagram of 16 QAM is $2/\sqrt{10}$.

According to the foregoing solution, when a minimum Euclidean distance between constellation points increases, an SNR requirement during data packet decoding can be reduced, decoding is successfully performed with a low SNR, and a probability of successful decoding is improved.

Figure 5:
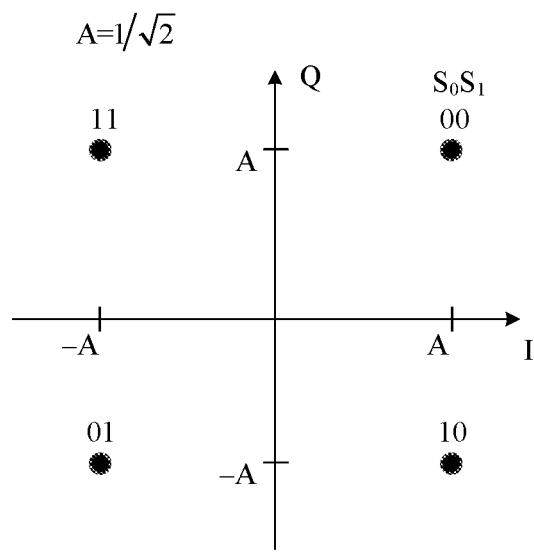
FIG. 5 is a schematic diagram of a third constellation diagram according to an embodiment of this application.

For example, the first modulation scheme and the second modulation scheme may be QPSK, and the third constellation diagram may be a constellation diagram shown in FIG. 5, each constellation point in the third constellation diagram includes 2 bits (that is, N=2), and the bits are sequentially denoted as $S_0$ and $S_1$. The first location may be $S_0$, and the second location may be $S_1$, or the second location may be $S_0$, and the first location may be $S_1$. Constellation points whose value of $S_0$ is 1 are 11 and 10, and a Euclidean distance between the two constellation points is 2, which is greater than a minimum Euclidean distance $\sqrt{2}$ between constellation points in a constellation diagram of QPSK. In addition, constellation points whose value of $S_0$ is 0 are 00 and 01, and a Euclidean distance between the two constellation points is 2, which is greater than a minimum Euclidean distance $\sqrt{2}$ between constellation points in the constellation diagram of QPSK. In this way, after a codeword corresponding to $S_0$ is successfully decoded, a Euclidean distance between constellation points with a same value of $S_0$ increases, so that a requirement for an SNR value during decoding of the codeword corresponding to $S_1$ can be reduced, and a probability of successful decoding is increased. However, this application is not limited thereto. In this example, the first modulation scheme and/or the second modulation scheme may alternatively be another modulation scheme whose minimum Euclidean distance is less than 2 such as 16 QAM and 64 QAM. Alternatively, the third constellation diagram may be a constellation diagram corresponding to one of the 8 matrices shown in Table 1. However, this application is not limited thereto.

TABLE 1

Example of a third constellation diagram when N = 2

$$\begin{bmatrix} 3 & 0 \\ 1 & 2 \end{bmatrix} \quad \begin{bmatrix} 3 & 1 \\ 0 & 2 \end{bmatrix} \quad \begin{bmatrix} 1 & 2 \\ 3 & 0 \end{bmatrix} \quad \begin{bmatrix} 1 & 3 \\ 2 & 0 \end{bmatrix}$$

$$\begin{bmatrix} 0 & 3 \\ 2 & 1 \end{bmatrix} \quad \begin{bmatrix} 0 & 2 \\ 3 & 1 \end{bmatrix} \quad \begin{bmatrix} 2 & 0 \\ 1 & 3 \end{bmatrix} \quad \begin{bmatrix} 2 & 1 \\ 0 & 3 \end{bmatrix}$$

In Table 1, one matrix corresponds to one constellation diagram. A value in a matrix is a decimal value corresponding to a binary constellation point in a constellation diagram corresponding to the matrix. In the matrix, two values in a first row correspond to two constellation points at Q=A, two values in a second row correspond to two constellation points at Q=−A, a first value in each row corresponds to a constellation point at I=−A, and a second value corresponds to a constellation point at I=A. For example, a matrix corresponding to the constellation diagram shown in FIG. 5 is $$\begin{bmatrix} 3 & 0 \\ 1 & 2 \end{bmatrix}.$$

Figure 6:
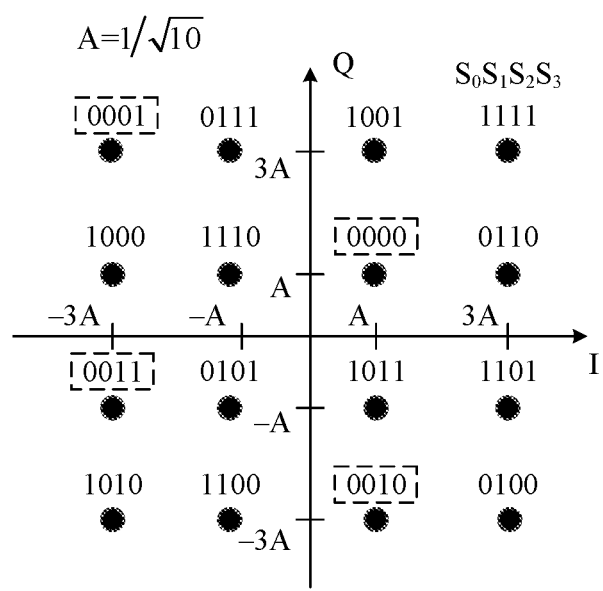
FIG. 6 is another schematic diagram of a third constellation diagram according to an embodiment of this application.

For example, the third constellation diagram may alternatively be a constellation diagram shown in FIG. 6. Each constellation point in the constellation diagram includes four bits (that is, N=4), and the bits are sequentially denoted as $S_0$, $S_1$, $S_2$, and $S_3$. In FIG. 6, for example, the first location includes $S_0$ and $S_1$, and the second location includes $S_2$ and $S_3$. As shown in FIG. 6, a minimum Euclidean distance between constellation points of 4 constellation points with same first location values is $4/\sqrt{10}$. For example, in four constellation points 0000, 0001, 0010, and 0011 whose $S_0S_1$ values at the first location are 00, a distance between constellation points 0001 and 0000 and a distance between constellation points 0011 and 0010 are 4A, and a distance between constellation points 0001 and 0011 and a distance between 0000 and 0010 are 4A. In this case, a minimum Euclidean distance between constellation points in the 4 constellation points is $4/\sqrt{10}$. In addition, a minimum Euclidean distance between 4 constellation points whose $S_0S_1$ values at the first location are 01, a minimum Euclidean distance between 4 constellation points whose $S_0S_1$ values at the first location are 10, and a minimum Euclidean distance between 4 constellation points whose $S_0S_1$ values at the first location are 11 are all $4/\sqrt{10}$. Similarly, a minimum Euclidean distance between constellation points of 4 constellation points with same second location values is also $4/\sqrt{10}$. That is, minimum Euclidean distances between 4 constellation points corresponding to any one of the second location values of 00, 01, 10, or 11 are all $4/\sqrt{10}$. The first modulation scheme and/or the second modulation scheme may be 16 QAM, 64 QAM, 256 QAM or another modulation scheme with a minimum Euclidean distance of less than $4/\sqrt{10}$. In this way, after any one of the first codeword and the second codeword is successfully decoded, a Euclidean distance between constellation points corresponding to the other codeword increases, so that a requirement for an SNR value during decoding of the codeword can be reduced, and a probability of successful decoding can be increased. However, this application is not limited thereto. In this example, the third constellation diagram may alternatively be a constellation diagram corresponding to one of the 8 matrices shown in Table 2. However, this application is not limited thereto.

TABLE 2

Example of a third constellation diagram when N = 4

$$\begin{bmatrix} 1 & 7 & 9 & 15 \\ 8 & 14 & 0 & 6 \\ 3 & 5 & 11 & 13 \\ 10 & 12 & 2 & 4 \end{bmatrix} \quad \begin{bmatrix} 3 & 5 & 11 & 13 \\ 8 & 14 & 0 & 6 \\ 1 & 7 & 9 & 15 \\ 10 & 12 & 2 & 4 \end{bmatrix} \quad \begin{bmatrix} 4 & 13 & 6 & 15 \\ 2 & 11 & 0 & 9 \\ 12 & 5 & 14 & 7 \\ 10 & 3 & 8 & 1 \end{bmatrix} \quad \begin{bmatrix} 12 & 5 & 14 & 7 \\ 2 & 11 & 0 & 9 \\ 4 & 13 & 6 & 15 \\ 10 & 3 & 8 & 1 \end{bmatrix}$$

$$\begin{bmatrix} 4 & 15 & 6 & 13 \\ 2 & 9 & 0 & 11 \\ 12 & 7 & 14 & 5 \\ 10 & 1 & 8 & 3 \end{bmatrix} \quad \begin{bmatrix} 12 & 7 & 14 & 5 \\ 2 & 9 & 0 & 11 \\ 4 & 15 & 6 & 13 \\ 10 & 1 & 8 & 3 \end{bmatrix} \quad \begin{bmatrix} 1 & 15 & 9 & 7 \\ 8 & 6 & 0 & 14 \\ 3 & 13 & 11 & 5 \\ 10 & 4 & 2 & 12 \end{bmatrix} \quad \begin{bmatrix} 3 & 13 & 11 & 5 \\ 8 & 6 & 0 & 14 \\ 1 & 15 & 9 & 7 \\ 10 & 4 & 2 & 12 \end{bmatrix}$$

In Table 1, one matrix corresponds to one constellation diagram. A value in a matrix is a decimal value corresponding to a binary constellation point in a constellation diagram corresponding to the matrix, and a first row, a second row, a third row, and a fourth row in the matrix respectively correspond to Q=2A, Q=A, Q=−A, and Q=−2A. A first column, a second column, a third column, and a fourth column in the matrix respectively correspond to I=2A, I=A, I=−A, and I=−2A. For example, a matrix corresponding to the constellation diagram shown in FIG. 6 is $$\begin{bmatrix} 1 & 7 & 9 & 15 \\ 8 & 14 & 0 & 6 \\ 3 & 5 & 11 & 13 \\ 10 & 12 & 2 & 4 \end{bmatrix}.$$

The foregoing describes the solutions in embodiments of this application with reference to the example of the third constellation diagram. The third constellation diagram may alternatively be another constellation diagram that meets a condition. For brevity, details are not described herein by using examples one by one.

The second device modulates L bits of the first codeword and K bits of the second codeword based on the third modulation scheme. The first location includes P bits, and the L bits may form ⌊L/P⌋ third modulation symbols. The second location includes N−P bits, the K bits may form $\lfloor K/N-P)\rfloor$ third modulation symbols. In this case, the second device may obtain min ($\lfloor L/P\rfloor$, $\lfloor K/N-P)\rfloor$) third modulation symbols based on the third modulation scheme. The second device may modulate remaining L−Pmin($\lfloor L/P\rfloor$, $\lfloor K/(N-P)\rfloor$) bits in the first codeword and remaining K−(N−P)min($\lfloor L/P\rfloor$, $\lfloor K/(N-P)\rfloor$) bits in the K bits to obtain R modulation symbols.

Optionally, the R modulation symbols are obtained through modulation based on the third modulation scheme.

In an implementation, the min($\lfloor L/P\rfloor$, $\lfloor K/(N-P)\rfloor$) third modulation symbols and the R modulation symbols may constitute a third data packet. That is, the third data packet includes modulation symbols obtained by modulating all bits in the first codeword and the second codeword.

In another implementation, the min($\lfloor L/P\rfloor$, $\lfloor K/(N-P)\rfloor$) third modulation symbols and the R modulation symbols may form a plurality of data packets that are separately sent by the second device to the first device, and the plurality of data packets include the third data packet.

Optionally, the third data packet includes only at least one third modulation symbol.

For example, L=67, K=59, a modulation order N of the third modulation scheme is 4, the first location includes P=2 bits, and the second location includes N−P=2 bits. L bits of the first codeword may form $\lfloor L/P\rfloor$=33, and K bits of the second codeword may form $\lfloor K/(N-P)\rfloor$=29. Therefore, the second device may obtain 29 third modulation symbols based on the third modulation scheme. The second device modulates remaining 67−2×29=9 bits in the first codeword and remaining 59−2×29=1 bits in the second codeword to obtain R modulation symbols. For example, the second device modulates the remaining bits by using the third modulation scheme. The second device may modulate the remaining 9 bits of the first codeword by adding three 0s, to obtain 4 modulation symbols, and modulate the remaining 1 bit of the second codeword by adding a 0, to obtain one modulation symbol. In this case, 5 modulation symbols (that is, R=5) obtained by modulating the remaining bits are obtained. Alternatively, the second device may connect the remaining 9 bits of the first codeword and the remaining 1 bit of the second codeword in series and add 0s to generate four modulation symbols (that is, R=4). A specific modulation scheme of the remaining bits may be a manner on which the first device and the second device reach a consensus. This is not limited in this application.

S260: The second device sends the third data packet to the first device, where the third data packet includes the at least one third modulation symbol.

Correspondingly, the first device receives the third data packet from the second device.

In an implementation, the second device obtains first configuration information, where the first configuration information indicates an association relationship between the third data packet and the first data packet, and/or indicates an association relationship between the third data packet and the second data packet. The second device determines the association relationship based on the first configuration information.

As an example rather than a limitation, the first configuration information is control information or a radio resource control (radio resource control, RRC) message.

Optionally, the control information may be downlink control information (downlink control information, DCI) sent by the network device to the terminal device, or may be sidelink control information (sidelink control information, SCI) between two terminal devices in a D2D communications manner.

In this application, obtaining information/data may be receiving information/data from external resources, or may be generating information/data internally. For example, the obtaining the first configuration information may be receiving the first configuration information from external resources, or may be generating the first configuration information internally.

For example, the association relationship between the third data packet and the first data packet and/or the association relationship between the third data packet and the second data packet are/is determined by the first device, and the first device sends the first configuration information to the second device. The second device obtaining the first configuration information indicates that the second device receives the first configuration information from the first device. Alternatively, the association relationship between the third data packet and the first data packet and/or the association relationship between the third data packet and the second data packet are/is determined by the second device. The second device internally generates the first configuration information, and determines that the third data packet includes a bit of the first codeword and a bit of the second codeword based on the first configuration information when the third data packet is generated. The second device may further send the first configuration information to the first device, so that the first device and the second device reach a consensus on the relationship between the third data packet and the first data packet and/or the association relationship between the third data packet and the second data packet.

For another example, the first configuration information is DCI. After determining the association relationship between the third data packet and the first data packet and/or the association relationship between the third data packet and the second data packet, the network device notifies the terminal device by using the DCI. If the second device is a network device, and the first device is a terminal device, after the second device generates the DCI internally, the second device sends the DCI to the first device. Alternatively, if the second device is a terminal device, and the first device is a network device, the second device receives the DCI from the network device, to obtain the association relationship between the third data packet and the first data packet and/or the association relationship between the third data packet and the second data packet.

For example, the first data packet, the second data packet, and the third data packet are sequentially sent based on a time sequence, and the DCI may indicate a time interval between the third data packet and the first data packet and/or a time interval between the third data packet and the second data packet. Alternatively, the first data packet, the second data packet, and the third data packet are at different frequency domain locations (for example, different carriers or different bandwidth parts of a same carrier) in a same time period, and the DCI may indicate a frequency domain location relationship between the third data packet and the first data packet and/or a frequency domain location relationship between the third data packet and the second data packet. However, this application is not limited thereto.

For another example, the first configuration information is DCI for scheduling the third data packet, and the DCI includes a HARQ process indication field. The HARQ process indication field indicates a first HARQ process and a second HARQ process. The first HARQ process corresponds to the first data packet, and the second HARQ process corresponds to the second data packet, indicating that the third data packet includes a bit in the first codeword and a bit in the second codeword. Optionally, a first indication field includes an identifier (for example, HARQ ID 1) of the first HARQ process and an identifier (for example, HARQ ID 2) of the second HARQ process, or the first indication field includes an index value, and the index value corresponds to the first HARQ process and the second HARQ process. For example, a network may preconfigure an index table, and each index value in the index table corresponds to two HARQ processes. However, this application is not limited thereto. For another example, the first codeword and the second codeword may be codewords of URLLC service data, and the first data packet, the second data packet, and the third data packet are carried on a configuration grant (or scheduling-free grant) resource, so that requirements on reliability and latency of an URLLC service can be ensured.

In another implementation, after sending the first data packet and the second data packet, and receiving first feedback information and second feedback information from the first device, the second device sends the third data packet to the first device.

The first feedback information indicates that the first data packet is not successfully received, and the second feedback information indicates that the second data packet is not successfully received.

S270: The first device decodes the first data packet, the second data packet, and the third data packet.

It should be understood that, in this application, decoding a data packet includes at least demodulating a modulation symbol in the data packet. Optionally, decoding may further include channel decoding. This is not limited in this application.

In an implementation, the first device may decode the first data packet after receiving the first data packet, and decode the second data packet after receiving the second data packet. When one of the first data packet and the second data packet is successfully decoded, the first device may combine the successfully decoded data packet and the third data packet, and then perform decoding.

For example, the first device separately decodes the first data packet and the second data packet, the first data packet is not successfully decoded, and the second data packet is successfully decoded to obtain the second codeword. The first device may demodulate, based on the second codeword, the third modulation symbol in the third data packet to obtain soft information that is of the first codeword and that corresponds to the first location, combine the soft information with soft information that is of the first codeword and that is obtained by demodulating the first data packet, and then perform decoding, to improve a probability of successfully obtaining the first codeword by decoding.

For another example, the first device fails to decode the first data packet to obtain the first codeword, and sends the first feedback information to the second device; and the first device fails to decode the second data packet to obtain the second codeword, and sends the second feedback information to the second device. After receiving the first feedback information and the second feedback information, the second device sends the third data packet to the first device. After receiving the third data packet, the first device demodulates the third data packet, combines soft information that is of the first codeword and that corresponds to the first location with soft information that is of the first codeword and that is obtained by demodulating the first data packet, and then performs decoding. In addition, the first device combines soft information that is of the second codeword and that corresponds to the second location and that is obtained by demodulating the third data packet with soft information that is of the second codeword and that is obtained by demodulating the second data packet, and then performs decoding. In this way, a higher SNR value of a codeword is obtained, and a decoding probability is increased. If the first device successfully obtains one of the codewords through decoding but still fails to decode the other codeword, the first device may further demodulate the third data packet by using the successfully decoded codeword as prior information, to obtain more accurate soft information of the codeword that fails to be decoded, and further improve a decoding success probability.

In another implementation, after receiving the third data packet, the second device may combine data information of the first data packet and related information of the first codeword in the third data packet for decoding, and combine data information of the second data packet and related information of the second codeword in the third data packet for decoding.

According to the foregoing solution, when a receive end can perform combined receiving, an SNR requirement for decoding a data packet can be reduced, decoding is successfully performed with a low SNR, a probability of successful decoding of the data packet is improved, and reliability of data transmission is further improved.

It should be noted that numbers of the steps in the flowchart of this application constitute no limitation on an execution sequence of the steps, and a sequence of the steps is determined by a logical relationship between the steps. For example, S230 in FIG. 2 may be before or after S220. This is not limited in this application.

Figure 7:
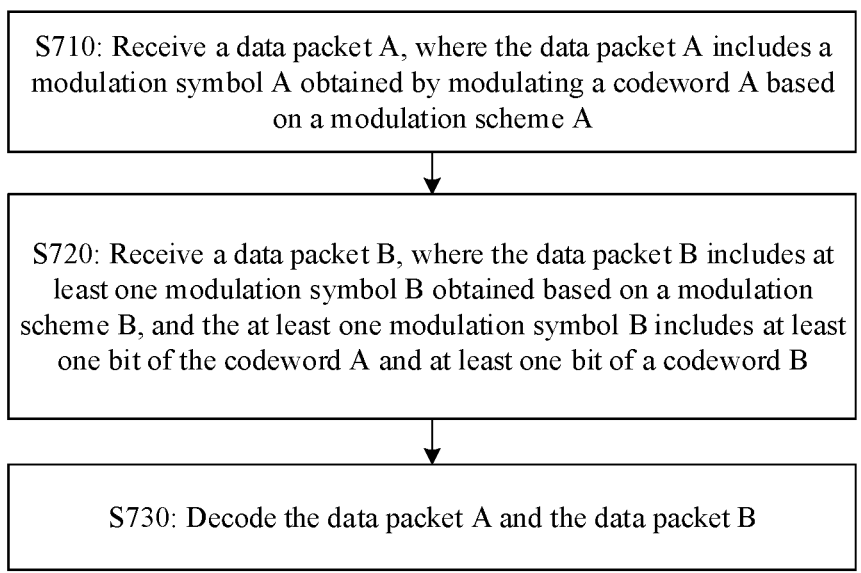
FIG. 7 is another schematic flowchart of a data transmission method according to an embodiment of this application.

FIG. 7 is another schematic flowchart of a data transmission method according to an embodiment of this application.

It should be noted that, for parts of the embodiment shown in FIG. 7 that are the same as or similar to those in the embodiment shown in FIG. 2, refer to the foregoing description of the embodiment shown in FIG. 2 unless otherwise defined or described. For brevity, details are not described herein again.

S710: A first device receives a data packet A, where the data packet A includes a modulation symbol A obtained by modulating a codeword A based on a modulation scheme A.

Optionally, the modulation scheme A corresponds to a constellation diagram A.

S720: The first device receives a data packet B, where the data packet B includes at least one modulation symbol B obtained based on a modulation scheme B, and the one modulation symbol B includes at least one bit of the codeword A and at least one bit of a codeword B.

Optionally, the modulation scheme B corresponds to a constellation diagram B. Each constellation point in the constellation diagram B includes N bits.

Optionally, N bits of each constellation point include a first location and a second location, constellation point mapping is performed on bits in the codeword A based on the first location, and constellation point mapping is performed on bits in the codeword B based on the second location, where the first location includes P bits in the N bits, the second location includes N–P bits in the N bits, and P is a positive integer less than N.

S730: The first device decodes the data packet A and the data packet B.

The first device decodes the data packet A to obtain the codeword A, and decodes the data packet B by using the codeword A as prior information, to obtain the codeword B. Alternatively, the first device combines soft information that is of the codeword A and that is obtained by demodulating the data packet A and soft information that is of the codeword A and that corresponds to the first location and that is obtained by demodulating the data packet B, decodes to obtain the codeword A, demodulates the data packet B by using the codeword A as prior information to obtain more accurate soft information of the codeword B, and then decodes to obtain the codeword B.

The data packet A and the data packet B may come from a same device. For example, both the data packet A and the data packet B are sent by the second device. Alternatively, the data packet A and the data packet B may come from different devices.

Figure 8:
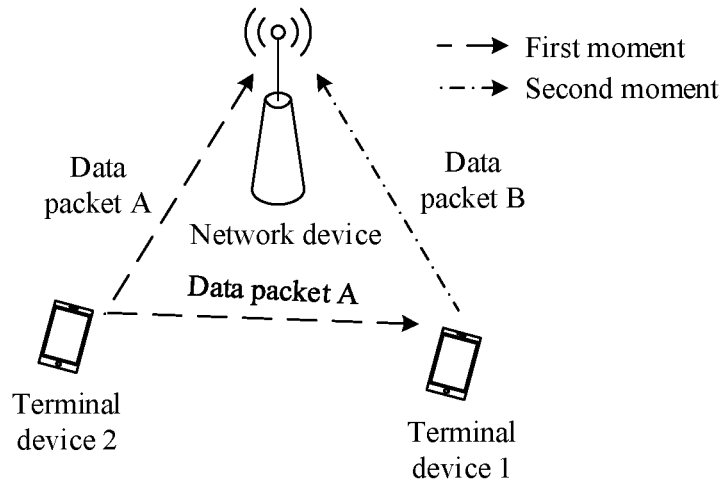
FIG. 8 is a schematic diagram of an application scenario to which a data transmission method according to this application is applicable.

For example, the embodiment shown in FIG. 7 may be applied to a scenario shown in FIG. 8. A terminal device 2 sends a data packet A at a first moment, a network device (that is, the first device) performs S710 to receive the data packet A, and a terminal device 1 also receives the data packet A and obtains a codeword A through decoding. The terminal device 1 modulates the codeword A of the terminal device 2 and a codeword B of the terminal device 1 by using a modulation scheme B, to obtain at least one modulation symbol B, and sends a data packet B to the network device, where the data packet B includes the at least one modulation symbol B. In this way, the network device may combine the data packet A and the data packet B to decode the codeword A, to obtain a higher SNR of the codeword A, so as to improve a probability of successful decoding of the codeword A. Alternatively, the codeword A may be used as prior information to decode the codeword B in the data packet B. However, this application is not limited thereto.

According to the foregoing solution, when a receive end can perform combined receiving, an SNR requirement during data packet decoding can be reduced, decoding is successfully performed with a low SNR, a probability of successful decoding of the data packet is improved, and reliability of data transmission is further improved.

Figure 9:
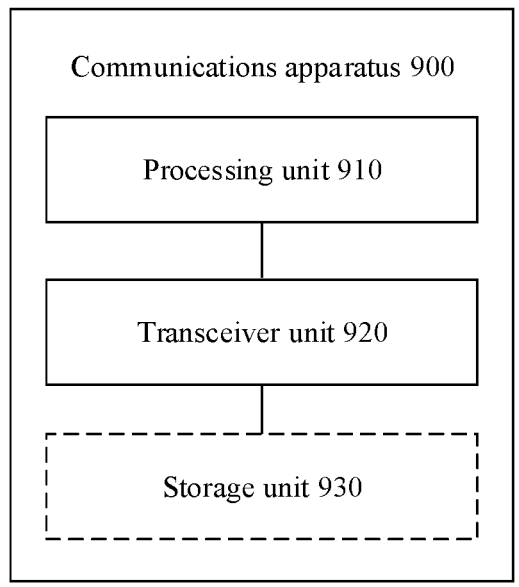
FIG. 9 is a schematic block diagram of an example of a communications apparatus according to of this application.

FIG. 9 is a schematic block diagram of a communications apparatus according to an embodiment of this application. As shown in FIG. 9, the communications apparatus 900 may include a processing unit 910 and a transceiver unit 920.

In a possible design, the communications apparatus 900 may correspond to the first device in the foregoing method embodiments, or a chip configured in (or used in) the first device, or another apparatus, module, circuit, unit, or the like that can implement the method of the first device.

It should be understood that the communications apparatus 900 may correspond to the first device in the methods 200 and 700 according to embodiments of this application, and the communications apparatus 900 may include units configured to perform the methods performed by the first device in the methods 200 and 700 in FIG. 2 and FIG. 7. In addition, each unit in the communications apparatus 900 and the foregoing other operations and/or functions are respectively used to implement corresponding procedures of the methods 200 and 700 in FIG. 2 and FIG. 7.

It should be further understood that when the communications apparatus 900 is a chip configured in (or used in) the first device, the transceiver unit 920 in the communications apparatus 900 may be an input/output interface or a circuit of the chip, and the processing unit 910 in the communications apparatus 900 may be a processor in the chip.

Optionally, the communications apparatus 900 may further include the processing unit 910. The processing unit 910 may be configured to process instructions or data, to implement a corresponding operation.

Optionally, the communications apparatus 900 may further include a storage unit 930. The storage unit 930 may be configured to store instructions or data. The processing unit 910 may execute the instructions or the data stored in the storage unit, to enable the communications apparatus to implement a corresponding operation.

It should be understood that a specific process in which each unit performs the foregoing corresponding steps is described in detail in the foregoing method embodiments. For brevity, details are not described herein again.

In another possible design, the communications apparatus 900 may correspond to the second device in the foregoing method embodiments, or a chip configured in (or used in) the second device, or another apparatus, module, circuit, unit, or the like that can implement the method of the second device.

It should be understood that the communications apparatus 900 may correspond to the second device in the method 200 according to embodiments of this application. The communications apparatus 900 may include units configured to perform the method performed by the second device in the method 200 in FIG. 2. In addition, each unit in the communications apparatus 900 and the foregoing other operations and/or functions are respectively used to implement corresponding procedures of the method 200 in FIG. 2.

It should be further understood that when the communications apparatus 900 is a chip configured in (or used in) the second device, the transceiver unit in the communications apparatus 900 is an input/output interface or a circuit in the chip, and the processing unit 910 in the communications apparatus 900 may be a processor in the chip.

Optionally, the communications apparatus 900 may further include the processing unit 910. The processing unit 910 may be configured to process instructions or data, to implement a corresponding operation.

It should be understood that a specific process in which each unit performs the foregoing corresponding steps is described in detail in the foregoing method embodiments. For brevity, details are not described herein again.

In an implementation, the communications apparatus 900 is a terminal device or is configured in a terminal device. Optionally, the transceiver unit 920 in the communications apparatus 900 may correspond to a transceiver 1010 in a terminal device 1000 shown in FIG. 10, and the storage unit 930 may correspond to a memory in the terminal device 1000 shown in FIG. 10.

Figure 10:
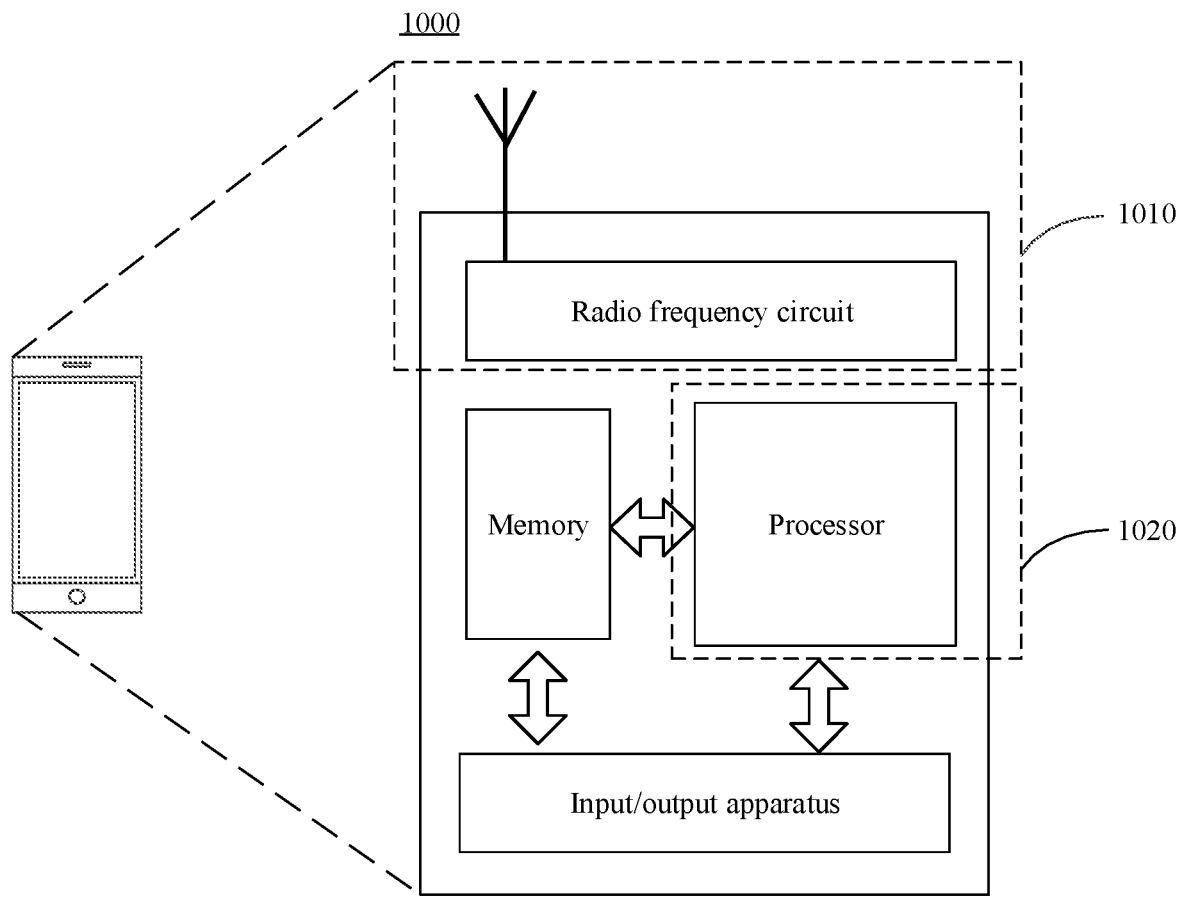
FIG. 10 is a schematic diagram of a structure of an example of a terminal device according to this application.

FIG. 10 is a schematic diagram of a structure of a terminal device 1000 according to an embodiment of this application. The terminal device 1000 may be used in the system shown in FIG. 1, to perform the functions of the terminal device in the foregoing method embodiments. As shown in the figure, the terminal device 1000 includes a processor 1020 and a transceiver 1010. Optionally, the terminal device 1000 further includes a memory. The processor 1020, the transceiver 1010, and the memory may communicate with each other through an internal connection path, to transfer a control signal and/or a data signal. The memory is configured to store a computer program. The processor 1020 is configured to execute the computer program in the memory, to control the transceiver 1010 to receive and send a signal.

The processor 1020 and the memory may be integrated into a processing apparatus, and the processor 1020 is configured to execute program code stored in the memory to implement the foregoing function. During specific implementation, the memory may alternatively be integrated into the processor 1020, or may be independent of the processor 1020. The processor 1020 may correspond to the processing unit in FIG. 6.

The transceiver 1010 may correspond to the transceiver unit in FIG. 9. The transceiver 1010 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that the terminal device 1000 shown in FIG. 10 can implement processes related to the terminal device in the method embodiments shown in FIG. 2 and FIG. 7. The operations and/or the functions of the modules in the terminal device 1000 are respectively intended to implement corresponding procedures in the foregoing method embodiments. For details, refer to the descriptions in the foregoing method embodiments. To avoid repetition, the detailed description is appropriately omitted herein.

The foregoing processor 1020 may be configured to perform an action that is implemented inside the terminal device and that is described in the foregoing method embodiments. The transceiver 1010 may be configured to perform a sending action by the terminal device for the network device or a receiving operation from the network device in the foregoing method embodiments. For details, refer to the descriptions in the foregoing method embodiments. Details are not described herein again.

Optionally, the terminal device 1000 may further include a power supply, configured to supply power to various components or circuits in the terminal device.

In addition, to make functions of the terminal device more perfect, the terminal device 1000 may further include one or more of an input unit, a display unit, an audio circuit, a camera, a sensor, and the like, and the audio circuit may further include a speaker, a microphone, and the like.

In another implementation, the communications apparatus 900 is a network device or is configured in a network device. Optionally, the transceiver unit 920 in the communications apparatus 900 may correspond to the transceiver 1110 in the network device 1100 shown in FIG. 11, and the storage unit 930 may correspond to the memory in the terminal device 1120 shown in FIG. 11.

Figure 11:
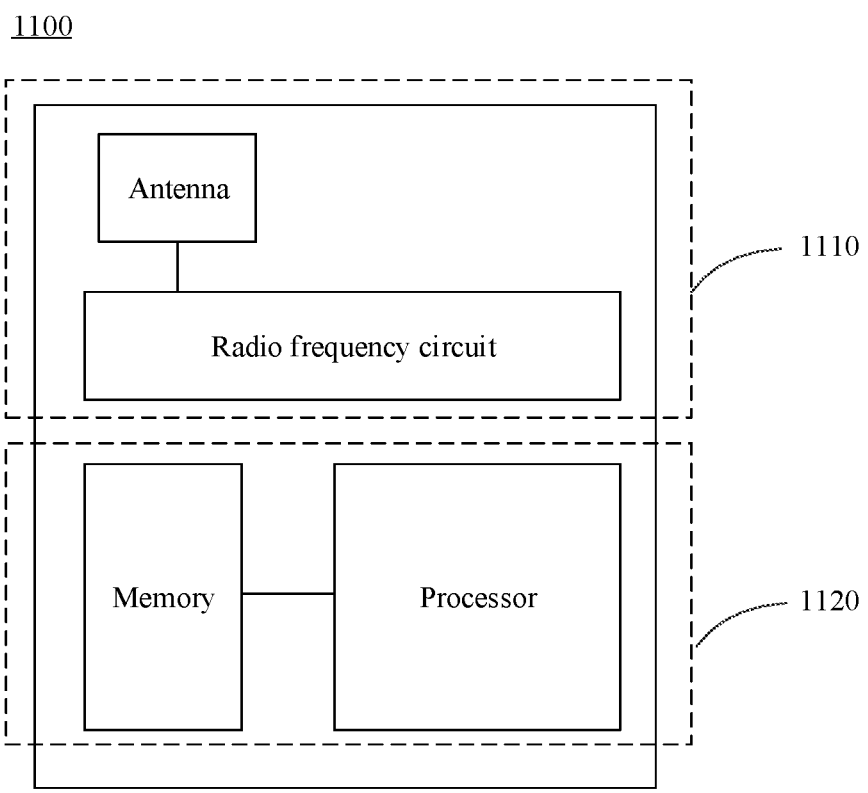
FIG. 11 is a schematic diagram of a structure of an example of a network device according to this application.

FIG. 11 is a schematic diagram of a structure of a network device according to an embodiment of this application. The network device 1100 may be applied to the system shown in FIG. 1, to perform functions of the network device in the foregoing method embodiments. For example, FIG. 11 may be a schematic diagram of a related structure of the network device.

It should be understood that the network device 1100 shown in FIG. 11 can implement processes related to the network device in the method embodiments shown in FIG. 2 and FIG. 7. The operations and/or functions of modules in the network device 1100 are used to implement corresponding procedures in the foregoing method embodiments. For details, refer to the descriptions in the foregoing method embodiments. To avoid repetition, the detailed description is appropriately omitted herein.

It should be understood that the network device 1100 shown in FIG. 11 may be an eNB or a gNB. Optionally, the network device includes a network device of a CU, a DU, an AAU, and the like. Optionally, the CU may be specifically classified into a CU-CP and a CU-UP. A specific architecture of the network device is not limited in this application.

It should be understood that the network device 1100 shown in FIG. 11 may be a CU node or a CU-CP node.

An embodiment of this application further provides a processing apparatus, including a processor and a (communications) interface; and the processor is configured to perform the method in any one of the foregoing method embodiments.

It should be understood that, the processing apparatus may be one or more chips. For example, the processing apparatus may be a field programmable gate array (field programmable gate array, FPGA), an application-specific integrated chip (application-specific integrated circuit, ASIC), a system on chip (system on chip, SoC), a central processing unit (central processor unit, CPU), a network processor (network processor, NP), a digital signal processor (digital signal processor, DSP), a micro controller unit (micro controller unit, MCU), a programmable logic device (programmable logic device, PLD), or another integrated chip.

An embodiment of this application further provides a communications apparatus, including: a logic circuit and a communications interface. The communications interface is configured to obtain to-be-processed data and/or output processed data. The logic circuit is configured to process the to-be-processed data or obtain the processed data, to enable the communications apparatus to implement the methods in the embodiments shown in FIG. 2 and FIG. 7.

In a feasible design, the communications interface includes an input interface and an output interface.

In an implementation, the logic circuit is configured to process a first codeword to obtain a first data packet, and process a second codeword to obtain a second data packet. The first data packet includes at least one first modulation symbol obtained by modulating the first codeword based on a first modulation scheme, and the second data packet includes at least one second modulation symbol obtained by modulating the second codeword based on a second modulation scheme. The communications interface is configured to output the first data packet and the second data packet (that is, the processed data). The logic circuit is further configured to process the first codeword and the second codeword to obtain a third data packet. The third data packet includes at least one third modulation symbol, one third modulation symbol is obtained by modulating one bit group based on a third modulation scheme, and the one bit group includes at least one bit in the first codeword and at least one bit in the second codeword. The communications interface is further configured to output the third data packet (which is also the processed data).

In another implementation, the communications interface is configured to input a first data packet and a second data packet (that is, the to-be-processed data). The first data packet includes at least one first modulation symbol obtained by modulating a first codeword based on a first modulation scheme, and the second data packet includes at least one second modulation symbol obtained by modulating a second codeword based on a second modulation scheme. The communications interface is further configured to input a third data packet (which is also the to-be-processed data). The third data packet includes at least one third modulation symbol, one third modulation symbol is obtained by modulating one bit group based on a third modulation scheme, and the one bit group includes at least one bit in the first codeword and at least one bit in the second codeword. The logic circuit is configured to decode the first data packet, the second data packet, and the third data packet.

This application further provides a computer program product. The computer program product includes computer program code. When the computer program code is executed by one or more processors, an apparatus including the processor is enabled to perform the methods in the embodiments shown in FIG. 2 and FIG. 7.

This application further provides a computer-readable storage medium, and the computer-readable storage medium stores program code. When the program code is run by one or more processors, an apparatus including the processor is enabled to perform the methods in the embodiments shown in FIG. 2 and FIG. 7.

This application further provides a system, including the foregoing first device and second device.

The first device and the second device in the foregoing apparatus embodiments exactly correspond to the first device and the second device in the method embodiments. A corresponding module or unit performs a corresponding step. For example, a communications unit (a transceiver) performs a receiving step or a sending step in the method embodiments, and a step other than the sending step and the receiving step may be performed by a processing unit (a processor). For a function of a specific unit, refer to a corresponding method embodiment. There may be one or more processors.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electrical, mechanical, or other forms.

The units described as separate parts may or may not be physically separate, and parts displayed as units may or may not be physical units, may be located in one position, or may be distributed on multiple network units. Some or all of the units may be selected based on actual requirements to achieve the objectives of the solutions of embodiments.

In embodiments of this application, when there is no logical conflict, embodiments may be mutually referenced. For example, methods and/or terms in the method embodiments may be mutually referenced, and functions and/or terms in the apparatus embodiments may be mutually referenced. For example, functions and/or terms between the apparatus embodiments and the method embodiments may be mutually referenced.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
sending a first data packet and a second data packet to a first device, wherein the first data packet comprises at least one first modulation symbol, the at least one first modulation symbol is obtained by modulating a first codeword based on a first modulation scheme, the second data packet comprises at least one second modulation symbol, and the at least one second modulation symbol is obtained by modulating a second codeword based on a second modulation scheme; and
sending a third data packet to the first device, wherein the third data packet comprises at least one third modulation symbol, one third modulation symbol is obtained by modulating one bit group based on a third modulation scheme, and the one bit group comprises at least one bit in the first codeword and at least one bit in the second codeword.

2. The method according to claim 1, wherein the first modulation scheme corresponds to a first constellation diagram, and each constellation point in the first constellation diagram comprises M bits; the second modulation scheme corresponds to a second constellation diagram, and each constellation point in the second constellation diagram comprises Q bits; and the third modulation scheme corresponds to a third constellation diagram, and each constellation point in the third constellation diagram comprises N bits, where M, Q, and N are positive integers.

3. The method according to claim 2, wherein the first modulation scheme is a quadrature amplitude modulation QAM with a modulation order of M, and there is only 1 bit having a different value between two adjacent constellation points in the first constellation diagram; and/or
the second modulation scheme is a quadrature amplitude modulation QAM with a modulation order of Q, and there is only 1 bit having a different value between two adjacent constellation points in the second constellation diagram.

4. The method according to claim 2, wherein each constellation point in the third constellation diagram comprises a first location and a second location, constellation point mapping is performed on bits in the first codeword based on the first location, constellation point mapping is performed on bits in the second codeword based on the second location, the first location comprises P bits in the N bits, the second location comprises N−P bits in the N bits, P and N are positive integers, and P<N.

5. The method according to claim 4, wherein
a minimum Euclidean distance between constellation points in a plurality of constellation points with a same first location value in the third constellation diagram is greater than a minimum Euclidean distance between constellation points in the second constellation diagram; and/or
a minimum Euclidean distance between constellation points in a plurality of constellation points with a same second location value in the third constellation diagram is greater than a minimum Euclidean distance between constellation points in the first constellation diagram.

6. The method according to claim 4, wherein the first codeword comprises L bits in total, and the second codeword comprises K bits in total; and
- if L>K, the third data packet comprises 2K/N third modulation symbols obtained by modulating K bits in the first codeword and K bits in the second codeword based on the third modulation scheme, and the third data packet further comprises modulation symbols obtained by modulating remaining L−K bits in the first codeword based on the first modulation scheme or the third modulation scheme; or
- if L<K, the third data packet comprises 2L/N third modulation symbols obtained by modulating L bits in the first codeword and L bits in the second codeword based on the third modulation scheme, and the third data packet further comprises modulation symbols obtained by modulating remaining K−L bits in the second codeword based on the second modulation scheme or the third modulation scheme.

7. The method according to claim 1, wherein the method further comprises:
- obtaining a first configuration information, wherein the first configuration information indicates an association relationship between the third data packet and the first data packet, and/or indicates an association relationship between the third data packet and the second data packet.

8. The method according to claim 1, wherein the sending a third data packet to the first device comprises:
- sending the third data packet after receiving first feedback information and second feedback information from the first device, wherein
- the first feedback information indicates that the first data packet is not successfully received, and the second feedback information indicates that the second data packet is not successfully received.

9. A data transmission method, comprising:
- receiving a first data packet and a second data packet from a second device, wherein the first data packet comprises at least one first modulation symbol obtained by modulating a first codeword based on a first modulation scheme, and the second data packet comprises at least one second modulation symbol obtained by modulating a second codeword based on a second modulation scheme;
- receiving a third data packet from the second device, wherein the third data packet comprises at least one third modulation symbol, the third modulation symbol is obtained by modulating one bit group based on a third modulation scheme, and the one bit group comprises at least one bit in the first codeword and at least one bit in the second codeword; and
- decoding the first data packet, the second data packet, and the third data packet.

10. The method according to claim 9, wherein the first modulation scheme corresponds to a first constellation diagram, and each constellation point in the first constellation diagram comprises M bits; the second modulation scheme corresponds to a second constellation diagram, and each constellation point in the second constellation diagram comprises Q bits; and the third modulation scheme is corresponding to a third constellation diagram, and each constellation point in the third constellation diagram comprises N bits, where M, Q, and N are positive integers.

11. The method according to claim 10, wherein the first modulation scheme is a quadrature amplitude modulation QAM with a modulation order of M, and there is only 1 bit having a different value between two adjacent constellation points in the first constellation diagram; and/or
- the second modulation scheme is quadrature amplitude modulation QAM with a modulation order of Q, and there is only 1 bit having a different value between two adjacent constellation points in the second constellation diagram.

12. The method according to claim 10, wherein each constellation point in the third constellation diagram comprises a first location and a second location, constellation point mapping is performed on bits in the first codeword based on the first location, constellation point mapping is performed on bits in the second codeword based on the second location, the first location comprises P bits in the N bits, the second location comprises N−P bits in the N bits, P and N are positive integers, and P<N.

13. The method according to claim 12, wherein the decoding the first data packet, the second data packet, and the third data packet comprises:
- combining information that is in the at least one first modulation symbol and the at least one third modulation symbol and that corresponds to the first location, and then performing decoding; and
- combining information that is in the at least one second modulation symbol and the at least one third modulation symbol and that corresponds to the second location, and then performing decoding.

14. The method according to claim 12, wherein
- a minimum Euclidean distance between constellation points in a plurality of constellation points with a same first location value in the third constellation diagram is greater than a minimum Euclidean distance between constellation points in the second constellation diagram; and/or
- a minimum Euclidean distance between constellation points in a plurality of constellation points with a same second location value in the third constellation diagram is greater than a minimum Euclidean distance between constellation points in the first constellation diagram.

15. The method according to claim 12, wherein the first codeword comprises L bits in total, and the second codeword comprises K bits in total; and
- if L>K, the third data packet comprises 2K/N third modulation symbols obtained by modulating K bits in the first codeword and K bits in the second codeword based on the third modulation scheme, and the third data packet further comprises modulation symbols obtained by modulating remaining L−K bits in the first codeword based on the first modulation scheme or the third modulation scheme; or
- if L<K, the third data packet comprises 2L/N third modulation symbols obtained by modulating L bits in the first codeword and L bits in the second codeword based on the third modulation scheme, and the third data packet further comprises modulation symbols obtained by modulating remaining K−L bits in the second codeword based on the second modulation scheme or the third modulation scheme.

16. The method according to claim 9, wherein the method further comprises:
- obtaining first configuration information, wherein the first configuration information indicates an association relationship between the third data packet and the first data packet, and/or indicates an association relationship between the third data packet and the second data packet.

17. The method according to claim 9, wherein receiving a third data packet from the second device comprises:
  receiving the third data packet after sending first feedback information and second feedback information to the second device, wherein
  the first feedback information indicates that the first data packet is not successfully received, and the second feedback information indicates that the second data packet is not successfully received.

18. A communications apparatus, comprising a processor, wherein the processor is connected to a memory, the memory is configured to store a computer program, and the processor is configured to execute the computer program stored in the memory, so that the communications apparatus is enabled to perform the method according to claim 1.

19. The apparatus according to claim 18, wherein the processor and the memory are integrated together.

20. A communications apparatus, comprising: a logic circuit and a communications interface, wherein the communications interface is configured to obtain to-be-processed data and/or output processed data, the logic circuit is configured to process the to-be-processed data or obtain the processed data, and the communications interface is further configured to output the processed data, so that the communications apparatus is enabled to perform the method according to claim 1.

* * * * *